United States Patent
Okanishi et al.

[11] Patent Number: 5,322,394
[45] Date of Patent: Jun. 21, 1994

[54] HIGHLY STIFF END MILL

[75] Inventors: Ryosuke Okanishi; Kazuyoshi Sasaki; Takahito Kuroda; Keiji Ishikawa; Osamu Goto, all of Osaka, Japan

[73] Assignee: Hitachi Tool Engineering, Ltd., Tokyo, Japan

[21] Appl. No.: 968,300

[22] Filed: Oct. 29, 1992

[30] Foreign Application Priority Data

Mar. 9, 1992 [JP] Japan .................. 4-086313
Jun. 8, 1992 [JP] Japan .................. 4-173910

[51] Int. Cl.$^5$ .................. B23C 5/10; B23C 5/00
[52] U.S. Cl. .................. 407/32; 407/54; 407/56; 407/63
[58] Field of Search .................. 407/54, 55, 56, 57, 407/62, 63, 119, 32

[56] References Cited

U.S. PATENT DOCUMENTS

| | | | |
|---|---|---|---|
| 4,266,449 | 5/1981 | Bielby | 407/119 |
| 4,560,308 | 12/1985 | Deller | 407/63 |
| 4,984,940 | 1/1991 | Bryant | 407/119 |
| 5,026,227 | 6/1991 | Nishi et al. | 407/119 |
| 5,188,488 | 2/1993 | Nakayama et al. | 407/54 |
| 5,190,420 | 3/1993 | Kishimoto et al. | 407/54 |

FOREIGN PATENT DOCUMENTS 33603 8/1985 Japan .................. 407/119

Primary Examiner—William E. Terrell
Attorney, Agent, or Firm—Koda & Androlia

[57] ABSTRACT

A highly stiff end mill comprising a shank, a plurality of helix cutting edges on the periphery of the end mill, the end mill being characterized in that a radial rake angle of the helix cutting edges in a cross section perpendicular to the longitudinal axis of the end mill is set in the range of $-29°$ to $0°$ and a core diameter of the end mill is set in the range of 70 to 90% of the outside diameter of the end mill.

By selectively determining the negative rake angle in the range described above, this end mill is applicable to hard materials and has general-purpose properties. The improper factors of the end mill, such as increased cutting resistance, can be compensated for by setting the core diameter thereof to the range described above. This end mill is also structured to be able to cut materials with less hardness values as well as hard materials, thereby covering a wide range of applications.

5 Claims, 11 Drawing Sheets

FIG. 1 (PRIOR ART 1)
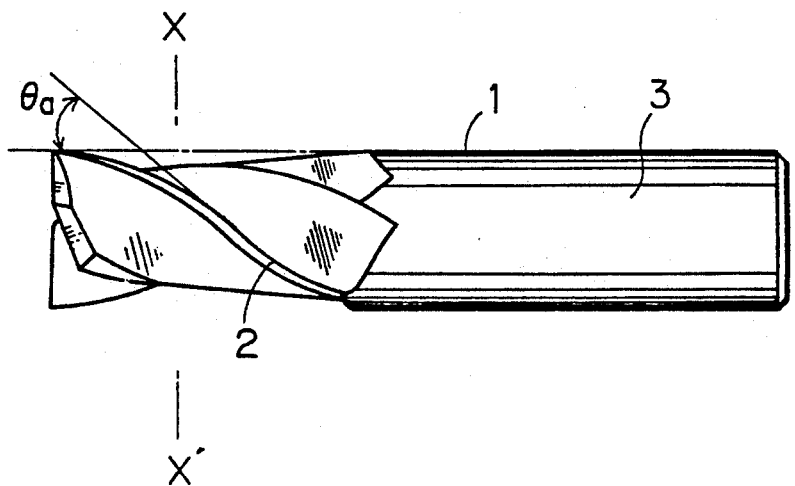
FIG. 2 (PRIOR ART 1)
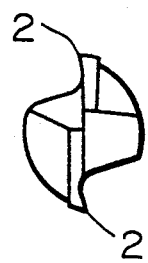
FIG. 3 (PRIOR ART 1)
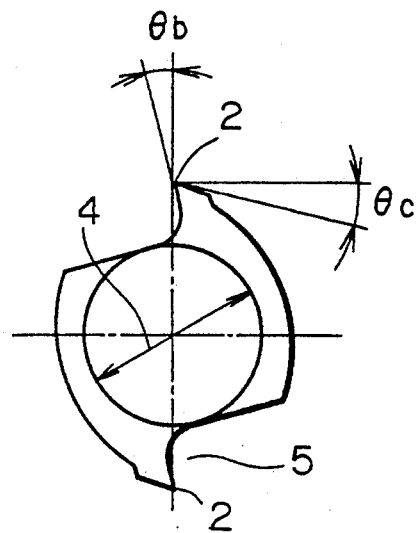

FIG.4 (PRIOR ART 2)
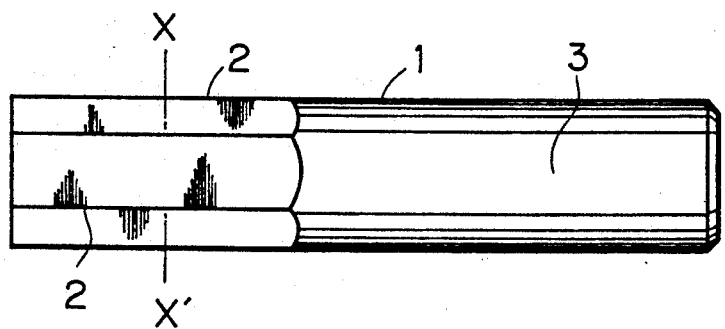
FIG.5 (PRIOR ART 2)
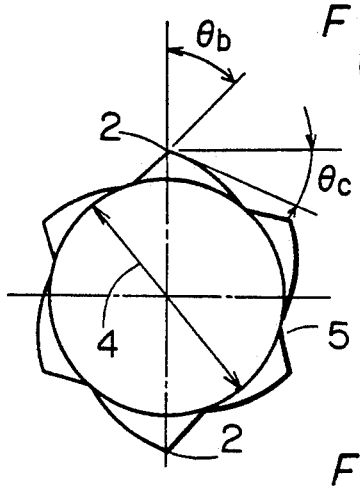
FIG.6 (PRIOR ART 3)
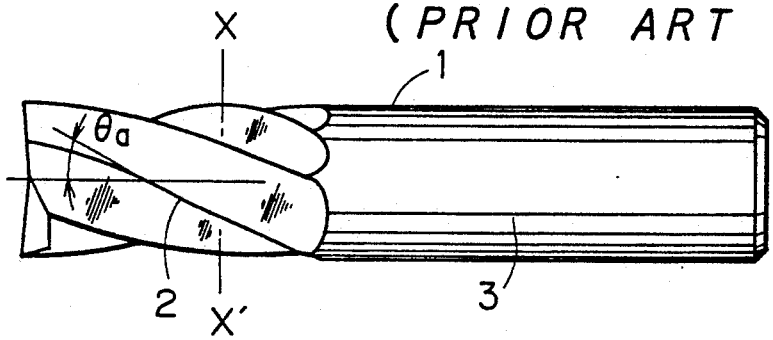
FIG.7 (PRIOR ART 3)
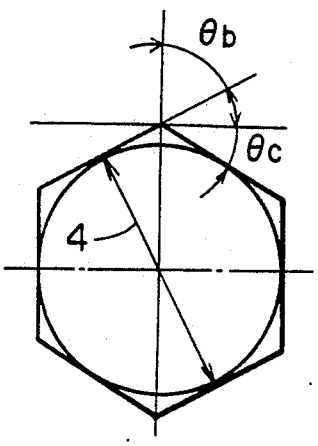

FIG.8 (PRIOR ART 4)
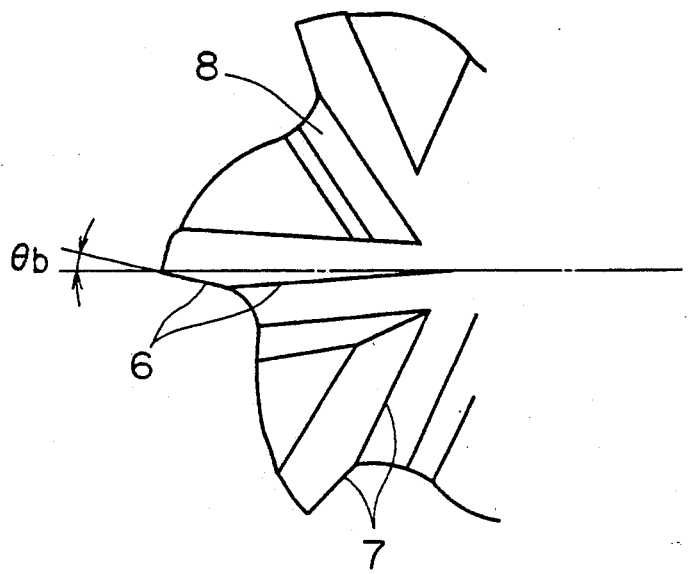
FIG.9 (PRIOR ART 4)
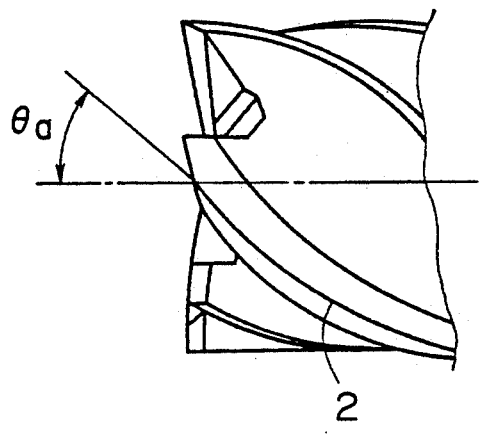

FIG. 19

| MEASUREMENT POSITION | PRESENT INVENTION (RAKE ANGLE -20°) | CONVENTIONAL TOOL(1) (RAKE ANGLE 10°) | CONVENTIONAL TOOL(2) (RAKE ANGLE -40°) | CONVENTIONAL TOOL(3) (RAKE ANGLE -60°) |
|---|---|---|---|---|
| (mm) 0, 2, 4, 6, 8, 10 | ⊕/⊖ (μm): 0, -2, -2, -3, 0, -2 | ⊕/⊖ (μm): 0, -6, -6, -2, -2, 1 | ⊕/⊖ (μm): 0, -4, -4, 2, -5, 2 | ⊕/⊖ (μm): 0, -3, -3, -2, -2, 2 |
| MAXIMUM DIFFERENCE | 3 μm | 7 μm | 7 μm | 5 μm |
| SURFACE ROUGHNESS (Rmax) | 3.0 μm | 4.1 μm | 5.3 μm | 3.8 μm |

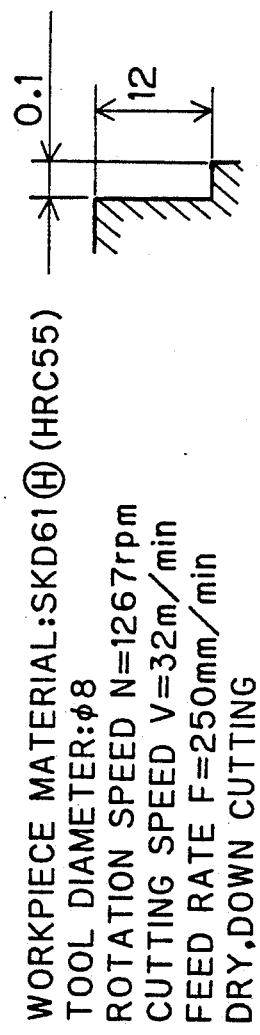

WORKPIECE MATERIAL: SKD61Ⓗ (HRC55)
TOOL DIAMETER: φ8
ROTATION SPEED N=1267rpm
CUTTING SPEED V=32m/min
FEED RATE F=250mm/min
DRY, DOWN CUTTING

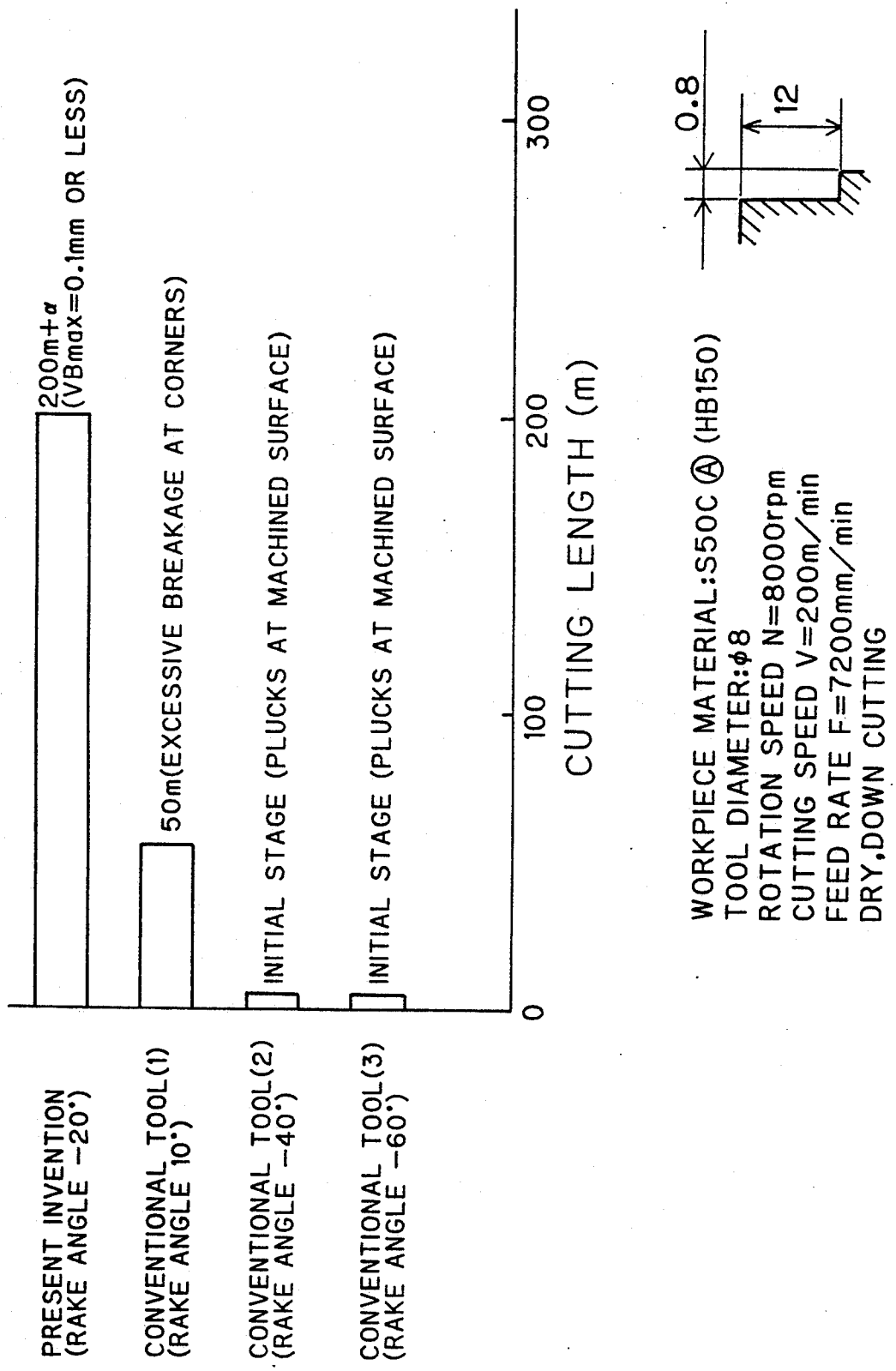

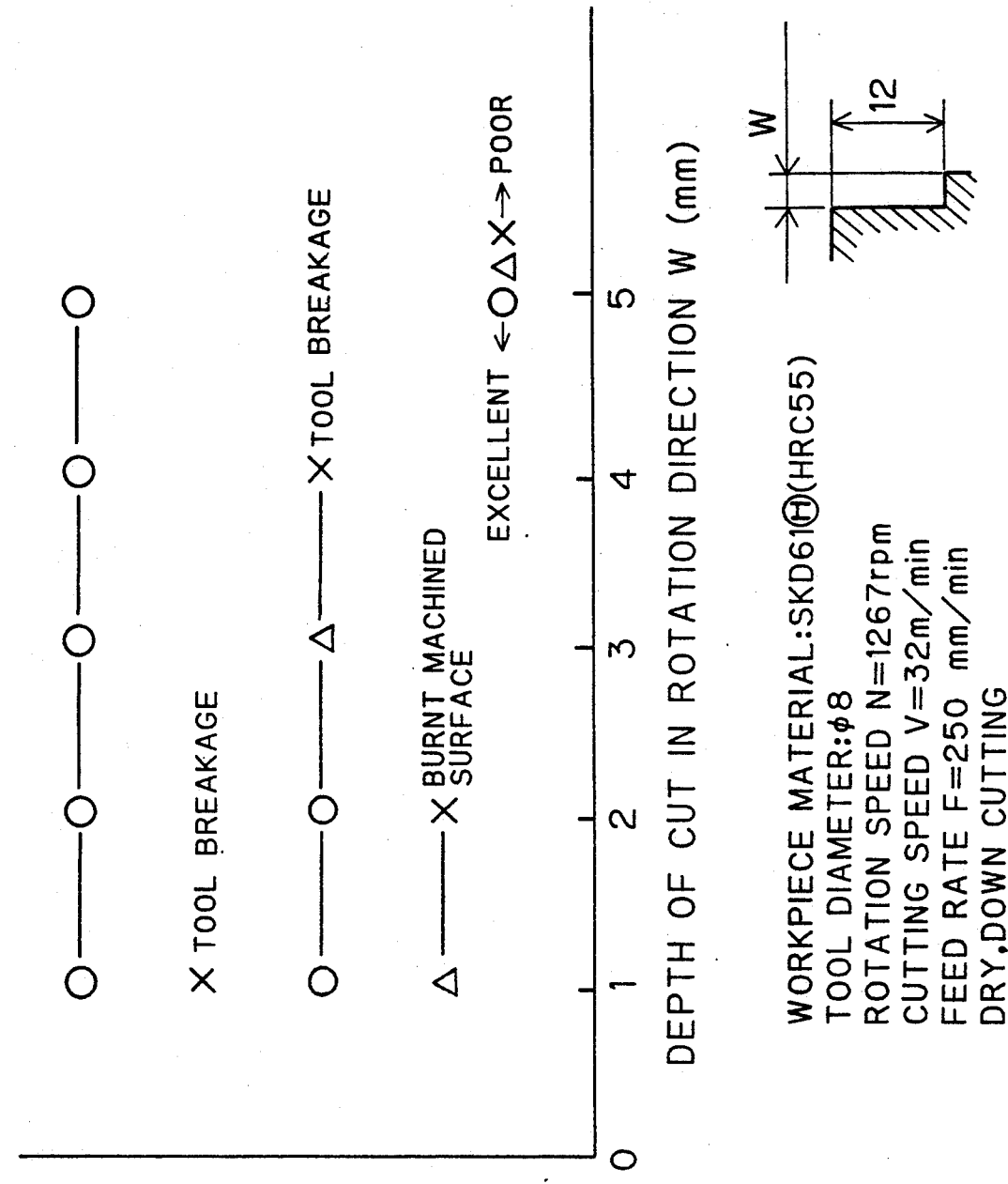

HIGHLY STIFF END MILL

BACKGROUND OF THE INVENTION

1. Field of the Invention

The present invention relates to an end mill used for machine tools such as milling machines and machining centers.

2. Prior Art

An end mill shown in FIGS. 1 to 3 (hereafter referred to as "conventional tool 1") is used as a rotary cutting tool when cutting steel and other general materials by using machine tools such as milling machines and machining centers. The conventional tool 1 is one of the most generally used conventional end mills. The peripheral cutting edges 2 of this conventional tool 1 have a positive rake angle $\theta b$ and the core diameter 4 of the cutting edge section is set to about 60% of the tool diameter to dispose wide chip pockets and to enhance the cutting performance of the tool.

As end mills used to cut workpiece materials having a hardness exceeding $H_{RC}50$, such as tool steel, an end mill shown in FIGS. 4 and 5 (hereafter referred to as "conventional tool 2") was proposed in the Laid-open Patent Application No. 3-178714, an end mill shown in FIGS. 6 and 7 (hereafter referred to as "conventional tool 3") was proposed in the Laid-open Patent Application Nos. 2-100727 and 3-26413 by the applicants of the present invention, and an end mill shown in FIGS. 8 and 9 (hereafter referred to as "conventional tool 4") was proposed in the Laid-open Patent Application No. 4-159010.

In particular, the conventional tools 2 and 3 can cut workpiece materials having a hardness of $H_{RC}60$ or more. These conventional tools have a large negative rake angle $\theta b$ of $-60°$ to $-30°$ and a large relief angle $\theta c$ on their peripheral cutting edges. The conventional tool 4 has a negative radial rake angle of $-22°$ to $-5°$ at the curved sections of the end-cutting edges thereof to enhance the strength of the end-cutting edges when cutting workpiece materials having a hardness exceeding $H_{RC}50$ or more. In FIGS. 1 to 7, numeral 1 represents a tool, numeral 3 represents a tool shank and numeral 5 represents a chip pocket.

Since working hours and man power are desired to be saved and workpieces are requested to have higher accuracy these days, NC machine tools such as machining centers have been used widely and mainly. For this reason, the demand for tools capable of ensuring reliable, highly accurate and efficient machining operation is increasing significantly.

In the case of the conventional tool 1, however, the cutting edge strength and the stiffness of the tool itself are insufficient to satisfy the above-mentioned demands. When the tool is used for high-speed, high-feed cutting, intense vibration generates and causes chipping and breakage, resulting in improper machined surfaces. The tool must thus be used in limited cutting conditions and it has low cutting efficiency. Even during normal cutting, sharp edges made of cemented carbide (inherently brittle material) attached to the conventional tool 1 still need to be improved with respect to tool stability.

When cutting workpieces having a hardness exceeding $H_{RC}50$, the conventional tool 1 wears out significantly, and is apt to be chipped and broken very easily in the same way as in the case of the above-mentioned high-speed, high-feed cutting. In order to cut hard workpieces, the conventional tools 2 and 3 are available. Since the peripheral cutting edges 2 of these conventional tools have a large negative rake angle $\theta b$ to satisfy the requirements for cutting hard workpieces, these tools are inferior in cutting performance and have great cutting resistance. In actual practice, these tools are applicable only to cutting operations which require slight depths of cut, such as finish cutting. In the case of the conventional tool 4, the length of its curved section is only 0.1 to 0.5 mm, making its chip pocket shallow. This tool is therefore applicable only to cutting operations which require slight depths of cut and cannot be used for general purposes.

When cutting workpieces having low hardness values, such as machine structural carbon steel, the effects of the characteristics of such workpieces on cutting tools become significant. The conventional tools 2 and 3 have low cutting efficiency and generate plucks on machined surfaces, causing a problem of very inferior cutting accuracy. Although the conventional tool 4 is also inferior in cutting efficiency, since its negative rake angle is smaller than those of the conventional tools 2 and 3, the surfaces machined by the conventional tool 4 are less affected by plucks. However, since its end-cutting edges are classified into a master tooth and a slave tooth, the strength of the slave tooth is reduced and the tool is apt to be chipped at its corners when cutting is performed under a heavy load.

As described above, the conventional tools 1 to 4, which have been made by more sufficiently delivering the characteristics of cemented carbide, are apt to cause problems of chipping and breakage when their cutting edges are sharp. When their cutting edges are obtuse, the tools are mainly used for finish cutting. When the rake angle is an intermediate value between the sharp and obtuse angles, that is, $\theta b = -20°$ to $0°$, the characteristics of both the sharp and obtuse angles are intermixed and delivered. The tools having such intermediate edge angles can be used for various applications, and can satisfy various accuracy and performance requirements. In actual practice, however, these matters have not yet been examined sufficiently.

SUMMARY OF THE INVENTION

It is therefore an object of the present invention to solve the above-mentioned problems, more particularly to overcome various problems caused when the basic cutting edge angle is made negative by utilizing the superior compressive strength of cemented carbide, and to provide a highly stiff end mill capable of cutting various workpieces ranging from those having low hardness values to those having high hardness values and also capable of performing highly accurate and efficient cutting.

The present invention will be detailed below referring to the accompanying drawings.

BRIEF DESCRIPTION OF THE DRAWINGS

FIG. 1 is a front view of the conventional tool 1;

FIG. 2 is a bottom view of FIG. 1;

FIG. 3 is an axially vertical sectional view taken on line x—x' in FIG. 1;

FIG. 4 is a front view of the conventional tool 2;

FIG. 5 is an axially vertical sectional view taken on line x—x' in FIG. 4;

FIG. 6 is a front view of the conventional tool 3;

FIG. 7 is an axially vertical sectional view taken on line x—x' in FIG. 6;

FIG. 8 is an enlarged partial bottom view of the conventional tool 4;

FIG. 9 is an enlarged partial front view of FIG. 8;

FIG. 19 is a group of charts explaining the cutting effects of the present invention;

FIG. 20 is a graph illustrating the cutting effects of the present invention and those of the conventional tools 1, 2 and 3 with respect to the length of cut;

FIG. 21 is a graph illustrating the cutting effects of the present invention and those of the conventional tools 1, 2 and 3 with respect to the depth of cut.

In the drawings, the same reference characters designate corresponding portions.

DETAILED DESCRIPTION OF THE INVENTION

Figure 10:
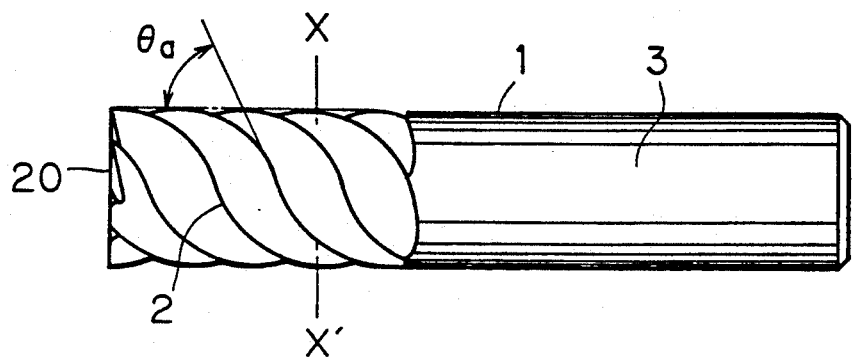
FIG. 10 is a front view illustrating a first example of the present invention.

To achieve the above-mentioned purposes, the radial rake angle $\theta b$ of the peripheral edges of the present invention's end mill is set to a negative value in the range of $-29°$ to $0°$ so that the tool can be applied for the cutting of hard workpieces, thereby providing the tool with general-purpose properties. In addition, improper factors such as increased cutting resistance caused by the structure due to the negative radial rake angle $\theta b$ are compensated for by setting the core diameter 4 of the tool in the range of 70 to 90% of the tool diameter. For higher cutting performance, the helix angle $\theta a$ of the peripheral cutting edges is set to a high helix value in the range of $40°$ to $60°$ to disperse cutting resistance and thereby to reduce the load applied to the cutting edges. Moreover, the land width, relief angle and flat width of the peripheral cutting edges 2 are set as described below so that the synergistic effects of these settings allow the tool to cut various workpieces ranging from those having high hardness values to those having low hardness values highly accurately and efficiently. More specifically, although the above-mentioned purposes of the present invention can be achieved sufficiently by setting the rake angle $\theta b$ of the peripheral cutting edges 2 in the range of $-29°$ to $0°$, the rake angle $\theta b$ should desirably be in the range of $-25°$ to $-10°$ in the axially vertical cross-section of the tool as the first setting to obtain more significant effects. If the angle is a negative value exceeding $-29°$, the tool of the present invention becomes actually equal to the conventional tools 2 and 3. In this case, the tool can be used only for finish cutting but lacks in general-purpose properties. If the angle is a positive value exceeding $0°$, the tool of the present invention becomes actually equal to the conventional tool 1. The angle is therefore set in the range of $-29°$ and $0°$.

As the second setting, the core diameter 4 should be made thicker to obtain higher stiffness. Although the core diameter 4 of the conventional tool 1 is about 60% of the tool diameter, the core diameter 4 of the present invention's tool is made thicker to about 80% of the tool diameter in the same way as the conventional tools 2, 3 and 4. By considering the dimensions of the chip pocket 5, the core diameter 4 is set in the range of 70 to 90% of the tool diameter. If the percentage value is less than 70%, the tool has insufficient stiffness and inferior cutting performance. If the percentage value exceeds 90%, the space in the chip pocket 5 is relatively made smaller, preventing smooth chip discharge. The core diameter 4 of the present invention's tool is thus set in the range of 70 to 90%.

Although the chip pocket 5 is made shallower by making the core diameter 4 thicker, even a shallow chip pocket can sufficiently discharge chips because of the following reasons. Since the basic shape of the cutting edge is negative, chips are sheared by the cutting edge. Chips can thus be separated smoothly from the tool and can have proper shapes, even when the chip pocket 5 is shallower than that formed in a tool having a positive rake angle $\theta b$ adopted in the case of the conventional tool 1. In addition, since the chips are discharged in the direction nearly opposite to the feed direction of the tool, chip clogging does not occur. The tool can therefore cut workpieces at various depths of cut in the radial direction, thereby maintaining sufficient general purpose properties.

As the third setting, the helix angle $\theta a$ of the peripheral cutting edges 2 is set to a high helix value in the range of $40°$ to $60°$ to disperse the cutting resistance of the edges and to relieve the load thereto. The high helix angle is obtained by increasing the contact length of the cutting edges. In this case, although the entire resistance received by the end mill increases, this increased resistance can be compensated for sufficiently by making the core diameter 4 thicker. If the helix angle $\theta a$ is less than $40°$, the load applied to the peripheral cutting edges 2 becomes larger and the performance of the tool becomes unstable. If the helix angle exceeds $60°$, the space in the chip pocket 5 becomes relatively smaller, being apt to cause unsmooth chip discharge. The helix angle is thus set in the range of $40°$ to $60°$.

Figure 22:
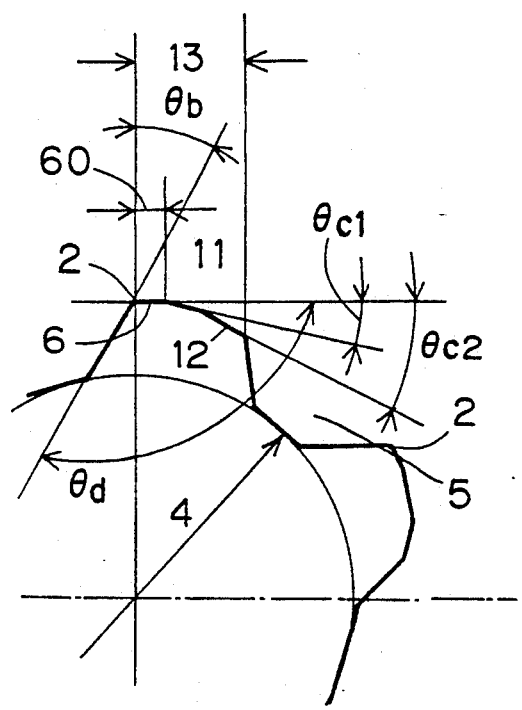
FIG. 22 is an axially vertical sectional view illustrating the cutting edges of a third example of the present invention.

As the fourth setting, the margin 6, the land 13 and the relief angle $\theta c1$ of the peripheral cutting edges shown in FIG. 22 are adjusted as necessary, and the eccentric relief 11 is adopted on the relief surface to obtain two-step relief surfaces 11, 12 and to enhance the strength of the cutting edges.

In the case of the conventional tool 1, enhancing the strength of the cutting edges by making the relief surfaces thicker has a limitation, since the rake angle $\theta b$ is positive. In the case of the present invention, since the rake angle $\theta b$ is negative, the cutting force is applied to the rake surfaces of the cutting edges. Chipping and breaking thus rarely occur even when impact force is applied to the peripheral cutting edges 2. In addition, as shown in FIG. 22, the angle $\theta d$ (hereafter referred to as "included angle") formed between the rake surface and the relief surface exceeds $90°$ and becomes larger than the included angle (about $70°$) of the conventional tool 1. The cutting edges of the present inventions tool can thus have a sufficient thickness and enhanced strength.

Furthermore, when the margin width 60 is adjusted to make the cutting edges thicker as shown in FIG. 22, these thickened cutting edges and the stiffness of the tool itself are combined to reduce the generation of chipping and breakage even under a heavy load, thereby obtaining superior cutting performance. Even under a heavier load, sufficient cutting performance can be obtained by providing the first and second relief surfaces 11, 12 to set the margin width 60 to about 0.05 mm or by providing a horning section (not shown) of 0.002 to 0.03 mm on the peripheral cutting edges 2.

Figure 13:
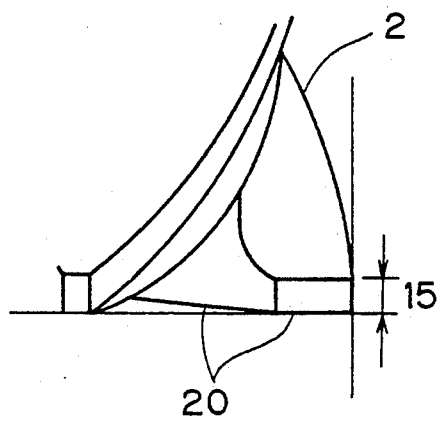
FIG. 13 is an enlarged partial view of the leading end of the end-cutting edge shown in FIG. 10.

As the fifth setting, the rake angle $\theta b$ is set in the range of $-29°$ and $0°$ as viewed from the bottom surface of the end-cutting edges 20 as described above and the flat width 15 of the end-cutting edges is set in the range of 0.1 to 3 mm as shown in FIG. 13. The flat width 15 is also provided for the conventional tools 1 and 4 to enhance the strength of the end-cutting edges 20. Since the helix angle of the present invention's tool is made particularly larger, the flat width 15 is set in the above-mentioned range to enhance the strength of the end-cutting edges 20 which are used as cutting start portions. In particular, since the strength of the end-cutting edges of the tool is important for heavy load cutting such as high-feed rate cutting, if the flat width is less than 0.1 mm, the effect of the provided flat section is lost. If the flat width exceeds 3 mm, cutting accuracy is lowered. The flat width is thus determined in the range of 0.1 to 3 mm.

Figure 14:
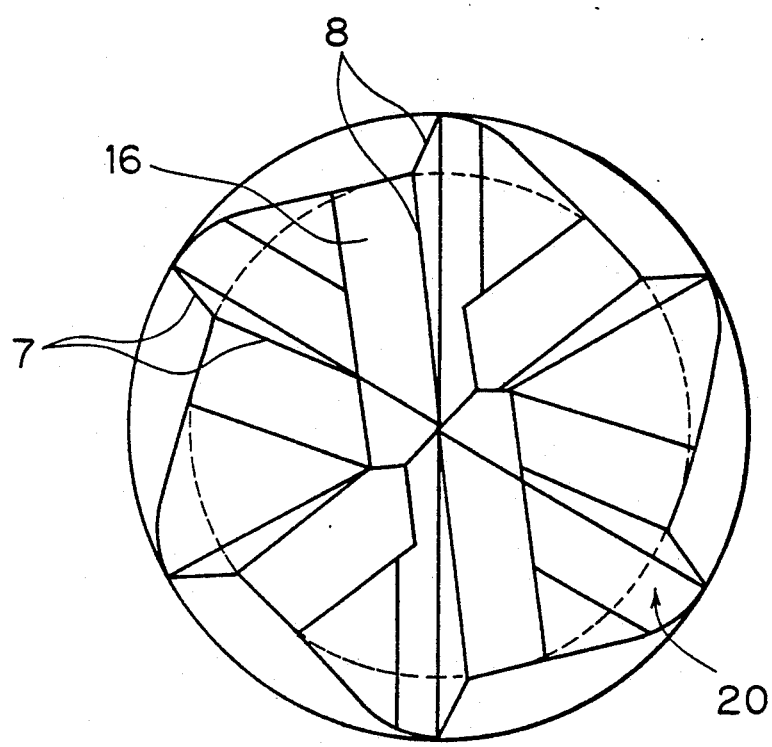
FIG. 14 is a bottom view illustrating a second example of the present invention.
Figure 15:
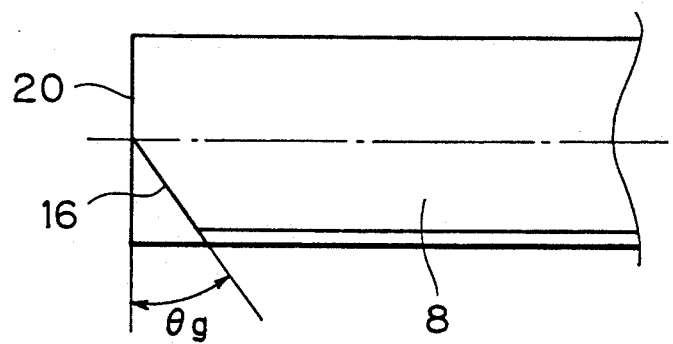
FIG. 15 is an axially partial sectional view of the master tooth shown in FIG. 14.

As the sixth setting, the gash angle $\theta g$ shown in FIG. 15 is adjusted to satisfy the requirements for vertical cutting. In the case of the cutting operations of the conventional tools 2, 3 and 4, the peripheral cutting edges 2 are mainly used for cutting. However, the tool of the present invention is also required to be used for horizontal cutting after vertical cutting to have general purpose properties. When the gash angle $\theta g$ is made larger in the range of 20° to 45°, sufficient chip discharging spaces can be obtained even during vertical cutting by setting the length of the slave tooth of the end-cutting edges in the range of 0.2 to 0.4 of the tool diameter. For this purpose, the gash angle $\theta g$ and the cutting edge length of the slave tooth 7 of the end-cutting edges are combined so that the chip discharging space can be obtained sufficiently by setting the gash angle $\theta g$ in the range of 20° to 45° and by setting the cutting edge length of the slave tooth 7 in the range of 0.2 to 0.4 of the tool diameter. In FIG. 14, numeral 8 represents the master tooth of the end-cutting edges and numeral 16 represents a gash face.

As the seventh setting, a greater effect can be obtained by using a tool material made of super-fine particle cemented carbide coated with hard thin film. Hard thin film pitching and separation rarely occur because of superior contact performance between the super-fine particle cemented carbide and the hard thin film, small friction resistance and excellent welding performance of the hard thin film, and the shape of the tool wherein chips are received by the rake surface by setting the rake angle to a negative value. As the hard thin film, solid powders, mixtures thereof or solid solutions selected from among Al, Si, carbides, nitrides, oxides and borides respectively of transition metals categorized as 4b, 5b and 6b groups in the periodic table, boron carbide, hard boron nitride and hard carbon are coated on the end mill in one, two or more layers at a thickness of 0.2 to 20 μm. More concretely, TiN film which has been put to practical use can be used sufficiently. To increase friction resistance, however, film containing TiCN and TiN-AlN for example can also be used sufficiently provided that the hard thin film has less affinity to chips.

Although square end mills have been described above as examples, the above-mentioned descriptions can also be applied to roughing end mills, ball end mills, tapered end mills and reamers by utilizing the characteristics of the end mill of the present invention, that is, high stiffness and excellent chip discharging performance.

A roughing end mill, in particular, a cemented carbide roughing end mill, for example, is insufficient in strength and is apt to cause problems of chipping and breakage, regardless of whether the cutting edges are sign-curved or nick cutting edges. In actual practice, throw-away type cutting edges are put to practical use as products so that they can be replaced even if they are broken. The highly stiff end mill of the present invention has high stiffness and discharges chips in the direction different from those of other end mills. For these reasons, when the breakage conditions of the cutting edges are examined carefully, minute chipping accumulates mainly at the portions where the cutting edges come closest to the crater wear portions when the rake angle is positive, and cracks occur at the portions, resulting in chipping and breakage of the cutting edges. However, the chipping and breakage can be prevented by changing the chip discharge direction, that is, by reducing crater wear of the sign-curved cutting edges and by making them into a concave shape for example, thereby extending the service life of the cutting edges.

Figure 16:
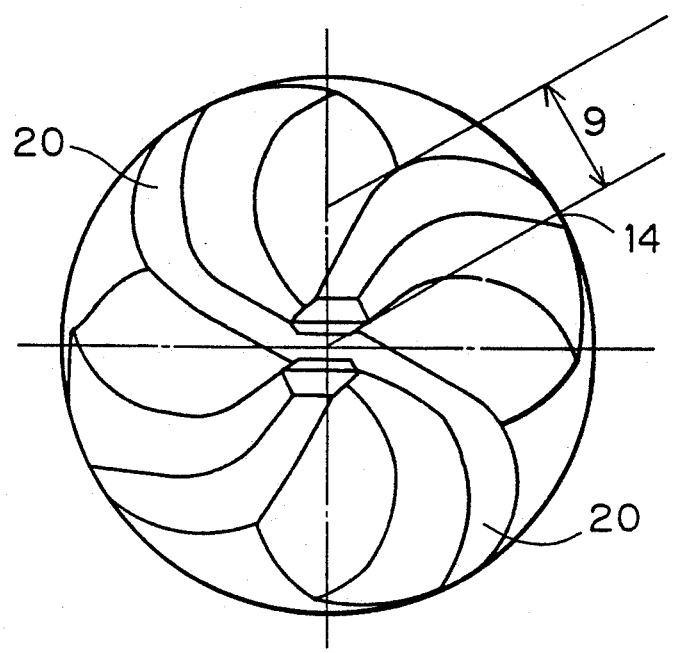
FIG. 16 is a bottom view of a ball end mill, one of the tools categorized as the second example of the present invention.
Figure 17:
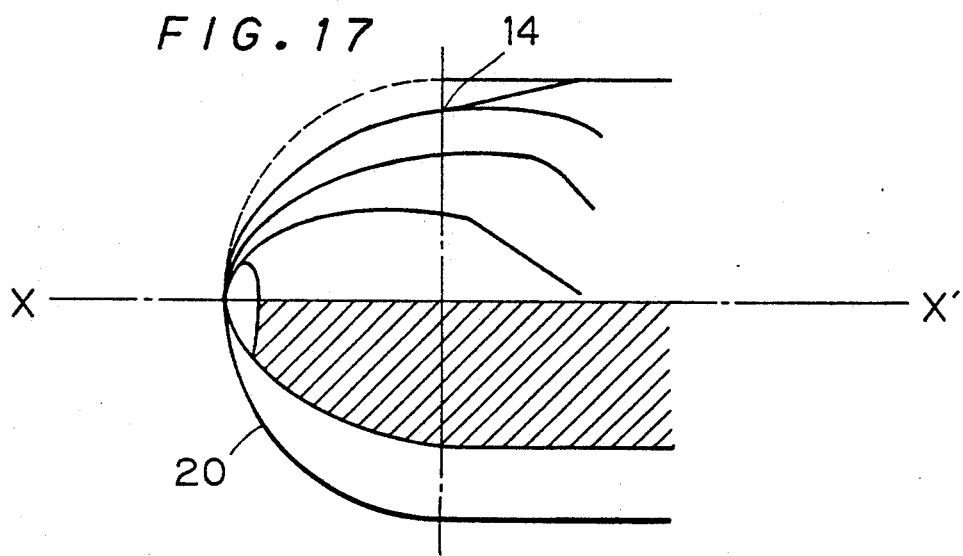
FIG. 17 is a partial front view of FIG. 16.
Figure 18:
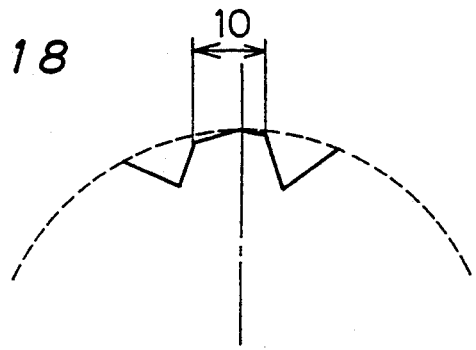
FIG. 18 is an axially sectional view taken on line x—x' in FIG. 17.

A ball end mill can also perform stable cutting, even when the amount of tool protrusion is large, by utilizing the high stiffness of the present invention's tool as shown in FIG. 16. In addition, the tool can have sufficient strength and perform stable cutting even at the low-speed portions close to the center of rotation by making the ball end cutting edges into a generally crossing f-shaped form with the rake angle $\theta b$ set at a negative value and by providing the rising parts of the flutes 14 close to the center of rotation as shown in FIGS. 15 and 16. Furthermore, since the ball end cutting edges have the generally crossing f-shaped form, the cutting edges can have sufficient strength even at the low-speed portions by smoothly connecting the ball end cutting edges from the peripheral cutting edges 2, by providing bulges 9 at the ball end cutting edge portions corresponding to 15 to 35% of the tool diameter and at the positions having a roundness of 40° to 50° R. at the ball end cutting edges, and by providing a center width 10 as shown in FIGS. 16, 17 and 18.

Since a reamer is used for cutting operation requiring dimensional accuracy after drilling is completed, its rake angle is set at a positive value (0° to 10°). Its helix angle is often set to about 10° to avoid vibration. Such a reamer has common problems; built-up edges are apt to attach to the tool because of the positive rake angle and the tool and workpieces are apt to be deformed elastically. However, the tool can have reduced friction resistance and cutting resistance by applying the negative rake angle of the present invention and by coating the tool. In addition, by enhancing the stiffness of the tool, the expansion allowance of the reamer can be reduced, and even if the reamer deflects when it is used to cut a deflected previously-drilled rough hole, the reamer is prevented from tracing the deflection of the hole.

The present invention will be detailed below referring to the following examples:

EXAMPLE

Figure 11:
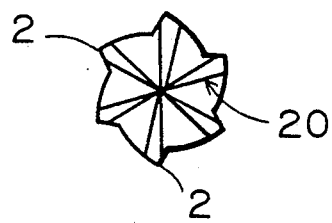
FIG. 11 is a bottom view of FIG. 10.
Figure 12:
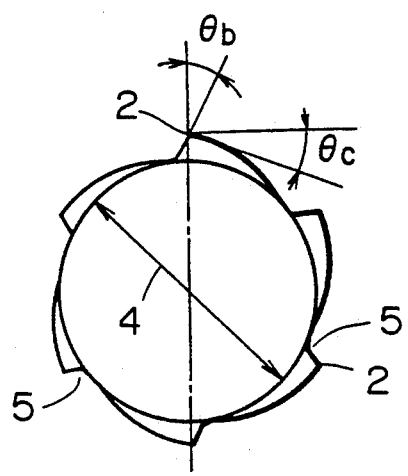
FIG. 12 is an axially vertical sectional view taken on line x—x' in FIG. 10.

FIGS. 10 to 12 show a first example of the present invention. The tool shown in the figures is a right hand cut, right hand helix end mill with a tool diameter of 8 mm and six teeth, coated with a TiN hard thin film. The rake and relief angles of the peripheral cutting edges in the direction perpendicular to the axis are $-20°$ and $10°$ respectively. The core diameter at the edge portion is set to 85% of the tool diameter, that is, 6.8 mm and the helix angle of the peripheral cutting edges is set to 50°.

TEST 1

FIGS. 19 to 21 show the results of comparison between the conventional tools 1, 2 and 3 and the tool of the present invention with respect to cutting performance. FIG. 19 shows the results of finish cutting when quenched and tempered alloy tool steel SKD61 (C 0.32 to 0.42%, Cr 4.50 to 5.50%, Mo 1.0 to 1.5%, V 0.80 to 1.20%) with a hardness of $H_{RC}55$ was used as workpieces. Both the squareness and the maximum surface roughness of the workpieces cut by the tool of the present invention were less than 3 μm. In particular, the squareness was highly accurate: about half the squareness attained by the conventional tools. The results obtained by the tool of the present invention were excellent without causing any winding and plucking.

TEST 2

FIG. 20 shows the results of a service life test conducted by using carbon steel JIS S50C (C 0.45 to 0.55% and other impure constituents) having a hardness of $H_B180$ as workpieces. As shown in Table 1 below, this test was conducted at the efficiency about 10 times as high as that attained in the standard cutting conditions for the conventional tools, that is, at a spindle speed of 8,000 rpm and a table feed rate of 7,200 mm/minute. The maximum wear at the relief surface of the tool of the present invention was not greater than 0.05 mm even after the tool was used to cut a length of 200 m. It was confirmed that the tool of the present invention was far superior to the conventional tools.

[TABLE 1]

| Item | Unit | Conventional tool 1 | Present invention |
|---|---|---|---|
| Axial width of cut | mm | 12 | 12 |
| Radial width of cut | mm | 3.2 | 0.8 |
| Rotation speed | rpm | 950 | 8,000 |
| Cutting speed | m/min | 24 | 200 |
| Table feed rate | m/min | 150 | 7,200 |
| Feed rate per tooth | mm/edge | 0.08 | 0.15 |
| Chip discharge rate | cc/min | 5.8 | 69 |
| Cutting efficiency | times | 1 | 12 |
| Tool life | m | 50 | 200 + α |

Note:
Tool diameter 8 mm, workpiece material JIS S50C (annealed $H_B180$)

TEST 3

Furthermore, FIG. 21 shows the results of a depth-of-cut limit test when quenched and tempered alloy tool steel JIS SKD61 having a hardness of $H_{RC}55$ was used as workpieces. When the depth of cut was increased gradually in the radial direction of the tested tools and tool damage conditions and workpiece surface conditions were examined. The conventional tool used for this test was chipped when the depth of cut reached 40% of the tool diameter. Adverse effects such as an affected layer were detected on the tested workpieces. The tool of the present invention was able to perform cutting with no problems even when the depth of cut was 50% of the tool diameter. The surfaces of the workpiece machined by the tool of the present invention were proper.

Table 2 shows the results of the depth-of-cut limit test when quenched and tempered alloy tool steel JIS SKD61 having a hardness of $H_{RC}55$ was used as workpieces and the margin width and relief angle of the tested tools were changed. The cutting speed was set to 40 m/min and the feed rate was set to 0.04 mm/tooth. The depth of cut was increased in the radial direction after a unit length (1 m) was cut, and the damage conditions of the tested tools and the machined surfaces of the workpieces were examined. When the margin width was zero, even the examples of the tools of the present invention caused chipping and breakage at a radial depth of cut of 4 mm (0.5 D). By providing some margin, the tools of the present invention was able to perform cutting with no problems even when the depth of cut was 50% of the tool diameter. The surfaces of the workpiece machined by the tools of the present invention were proper.

[TABLE 2]

| Margin width (mm) | Edge treatment | Radial depth of cut (mm) | | | | |
|---|---|---|---|---|---|---|
| | | 0.1 D | 0.2 D | 0.3 D | 0.4 D | 0.5 D |
| Present inv. 0 | None | ○ | ○ | ○ | x | x |
| Present inv. 0 | Round | ○ | ○ | ○ | ○ | x |
| Present inv. 0.01 | None | ○ | ○ | ○ | ○ | x |
| Present inv. 0.02 | None | ○ | ○ | ○ | ○ | x |
| Present inv. 0.04 | Round | ○ | ○ | ○ | ○ | ○ |
| Present inv. 0.05 | None | ○ | ○ | ○ | ○ | ○ |
| Compared ex. 0.1 | None | ○ | ○ | △ | △ | x |

(Note)
○: Stable cutting condition
△: Unstable cutting condition (chipping)
x: Impossible cutting (breakage)

As described above, the highly stiff end mill of the present invention was able to cut a variety of workpieces ranging from materials having low hardness values, such as machine structural carbon steel to materials having high hardness values exceeding $H_{RC}55$, such as hardened die steel at high efficiency and accuracy. Moreover, the cutting edges of the tool of the present invention have high strength and the tool itself is highly stiff. Besides, since the tool has excellent cutting performance, it is very effective in significantly extending its service life, achieving high cutting stability and greatly enhancing the reliability thereof.

What is claimed is:

1. A highly stiff end mill comprising a shank, a plurality of helix cutting edges on a periphery of the end mill defining chip pockets therebetween said end mill being characterized in that a radial rake angle of the helix cutting edges in a cross section perpendicular to a longitudinal axis of said end mill is set in the range of $-29°$ to $0°$, a depth of a chip pocket as measured from a radially outer edge to a radially inner point of said chip pocket is equal to 5 to 15% of an outside diameter of the end mill and a core diameter of the end mill is equal to 70 to 90% of an outside diameter of said end mill.

2. A highly stiff end mill according to claim 1, wherein a helix angle of the helix cutting edges is set in the range of 40° to 60°.

3. A highly still end mill according to claim 1 or 2, having cutting edges disposed on the end of the end mill of a flat width set in the range of 0.1 to 3 mm.

4. A highly still end mill according to claim 1, wherein at least one hard material selected from the group consisting of Al, Si, carbides, nitrides, oxides and borides respectively of transition metals characterized as the 4b, 5b and 6b groups in the periodic table, boron carbide, hard boron nitride and hard carbon are coated on said end mill in at least one layer at a thickness of 0.2 to 20 μm.

5. A highly stiff end mill according to claim 4, wherein said end mill is further coated with TiN as an outermost layer.

* * * * *

UNITED STATES PATENT AND TRADEMARK OFFICE
CERTIFICATE OF CORRECTION

PATENT NO. : 5,322,394

DATED : June 21, 1994

INVENTOR(S) : Ryosuke Okanishi, et al.

It is certified that error appears in the above-identified patent and that said Letters Patent is hereby corrected as shown below:

On the Title Page:
Item [30] Foreign Application Priority Data:

Change "Mar. 9, 1992 [JP]  Japan ............. 4-086313"
to    --Mar. 10, 1992 [JP]  Japan ............. 4-086313--

Signed and Sealed this

Twenty-third Day of August, 1994

Attest:

BRUCE LEHMAN

Attesting Officer

Commissioner of Patents and Trademarks